United States Patent [19]

Collis

[11] Patent Number: 4,989,386
[45] Date of Patent: Feb. 5, 1991

[54] PANEL BUILDING ELEMENTS

[76] Inventor: Howard G. Collis, 151 Hoel Isaf, Radyr, Cardiff, Great Britain, CF4 8DX

[21] Appl. No.: 360,898
[22] PCT Filed: Nov. 26, 1987
[86] PCT No.: PCT/GB87/00843
 § 371 Date: May 25, 1989
 § 102(e) Date: May 25, 1989
[87] PCT Pub. No.: WO88/03978
 PCT Pub. Date: Jun. 2, 1988

[30] Foreign Application Priority Data

Nov. 27, 1986 [GB] United Kingdom ............... 8628320
Jun. 25, 1987 [GB] United Kingdom ............... 8714856

[51] Int. Cl.$^5$ .............................................. E04B 2/18
[52] U.S. Cl. ......................................... 52/584; 52/285; 52/295; 52/583
[58] Field of Search ............... 52/295, 275, 284, 587, 52/585, 584, 285

[56] References Cited

U.S. PATENT DOCUMENTS

| | | | |
|---|---|---|---|
| 1,704,255 | 3/1929 | Lewis | 52/293 |
| 1,825,195 | 9/1931 | McAvoy et al. | 52/275 |
| 2,540,468 | 2/1951 | Anderson | 52/585 |
| 2,568,133 | 9/1951 | Swisher, Sr. et al. | 52/275 |
| 3,280,526 | 10/1966 | Pepitone | 52/585 |
| 3,285,635 | 11/1966 | Whelan | 52/584 |
| 3,286,423 | 11/1966 | Donlon | 52/585 |
| 3,332,182 | 7/1967 | Mark | 52/584 |
| 3,462,897 | 8/1969 | Weinnott | 52/295 |
| 3,567,260 | 3/1971 | Novis | 52/584 |
| 4,074,141 | 2/1978 | Bryant | 52/584 |
| 4,569,167 | 2/1986 | Staples | 52/295 |

FOREIGN PATENT DOCUMENTS

| | | | |
|---|---|---|---|
| 1019069 | 10/1982 | Fed. Rep. of Germany | 52/585 |
| WO83/03112 | 9/1983 | PCT Int'l Appl. | |
| 539431 | 9/1941 | United Kingdom | |
| 784299 | 10/1957 | United Kingdom | |
| 1118405 | 7/1968 | United Kingdom | |

Primary Examiner—Michael Safavi
Attorney, Agent, or Firm—McAulay Fisher Nissen & Goldberg

[57] ABSTRACT

A building element 20 comprises a double-skinned panel main member 22, and an elongate fixing member 24 therefor projecting therefrom with a distal shoulder 26 facing the main member 22, the fixing member 24 being provided with anchorage means 24,40,42 passing completely through a block 64 at the edge of the main member 22. The element 20 may be in the form of a kit of parts including holding means 40,42 and spacing means 44. Preferably, element 20 has holes 80 for fixing members 24 of a contiguous element, retained by members 36 inserted through slots 88 and bearing against inner face 84 of block 64.

The fixing members as pins 24 may extend perpendicular to edge 56 for corner fixing together of contiguous elements. Pins 24 may be retained at inner face 70 of block 62 by similar means or by threaded means. Pins 24 may be replaced by depending rods 122 bent to provide shoulders 126 in an anchorage trench 128 in flooring base 134.

7 Claims, 6 Drawing Sheets

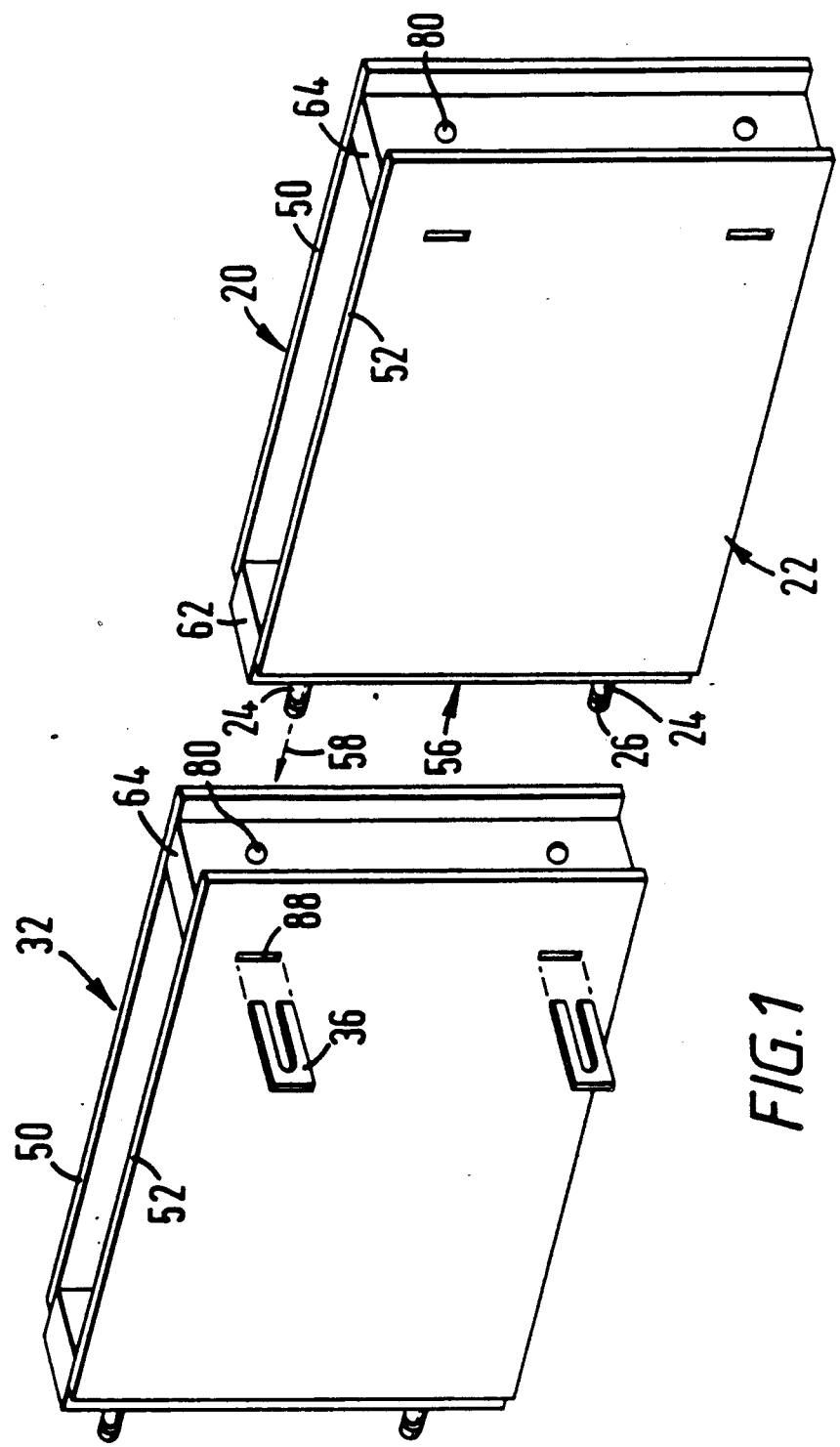

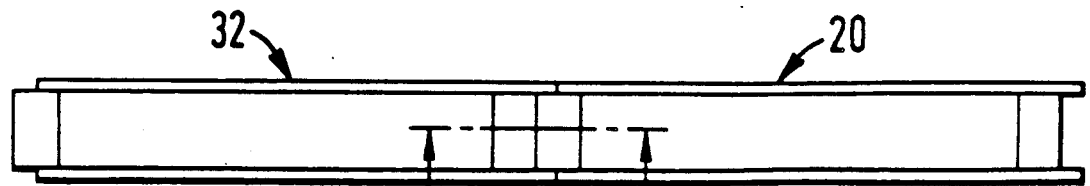
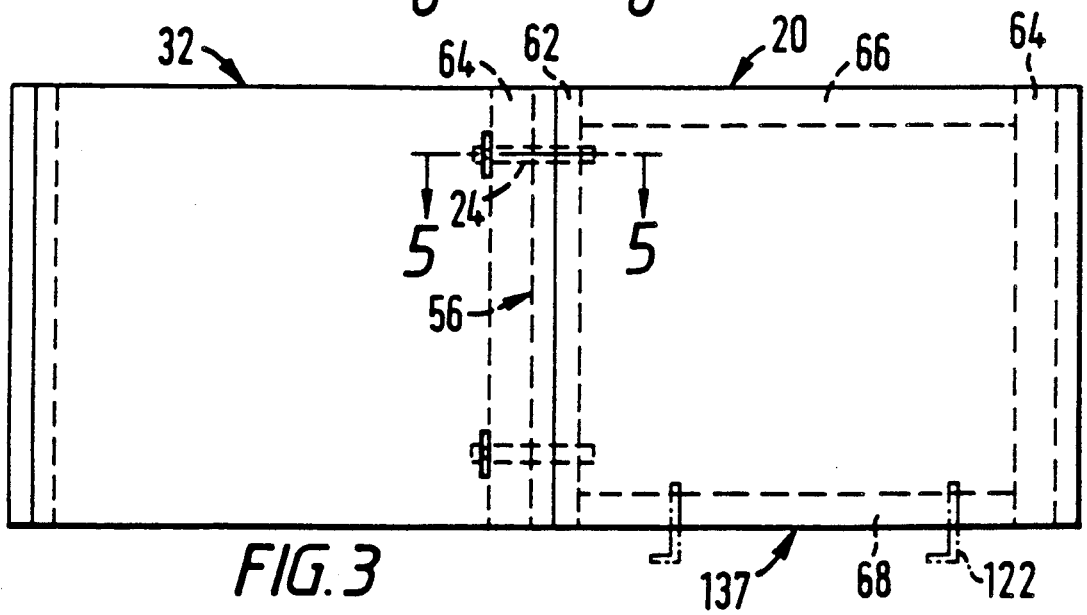
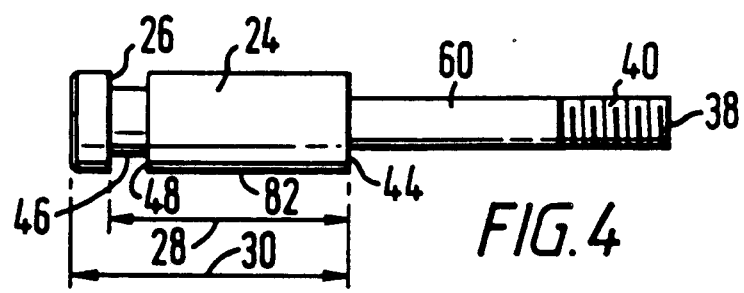
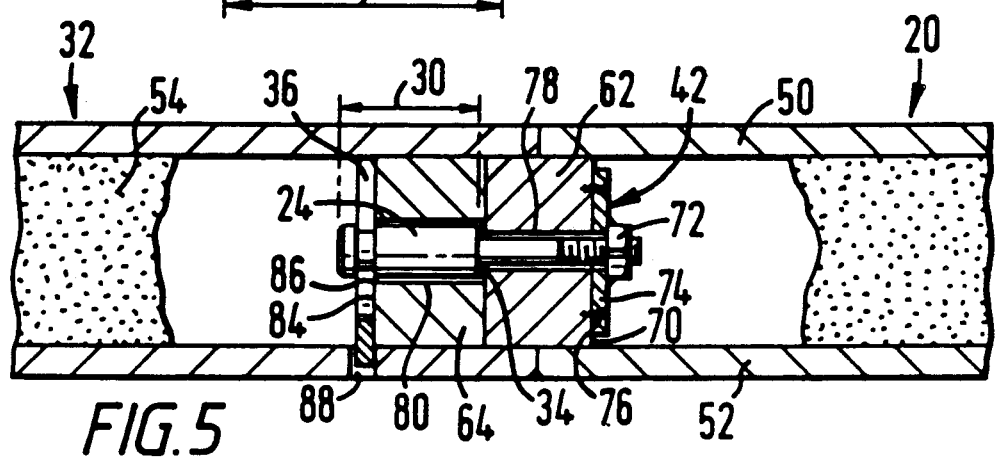

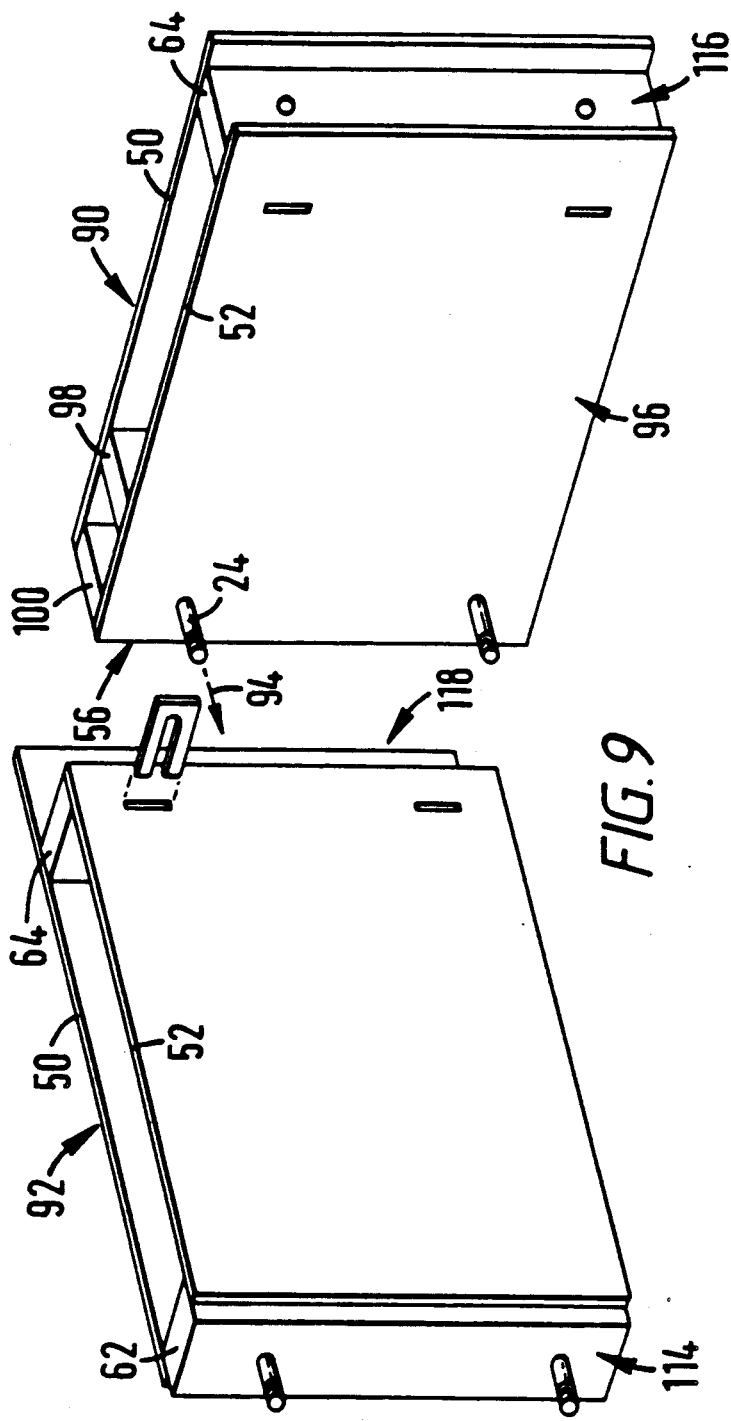
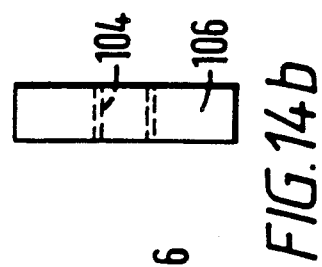
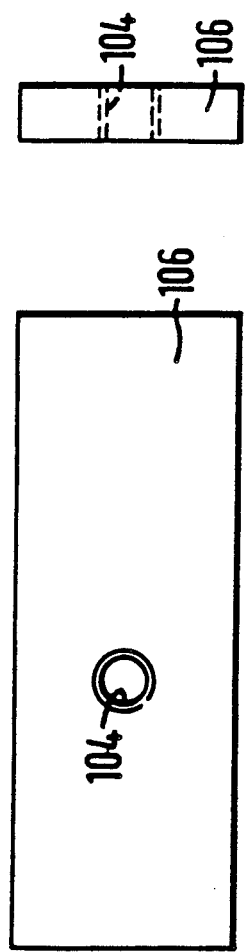

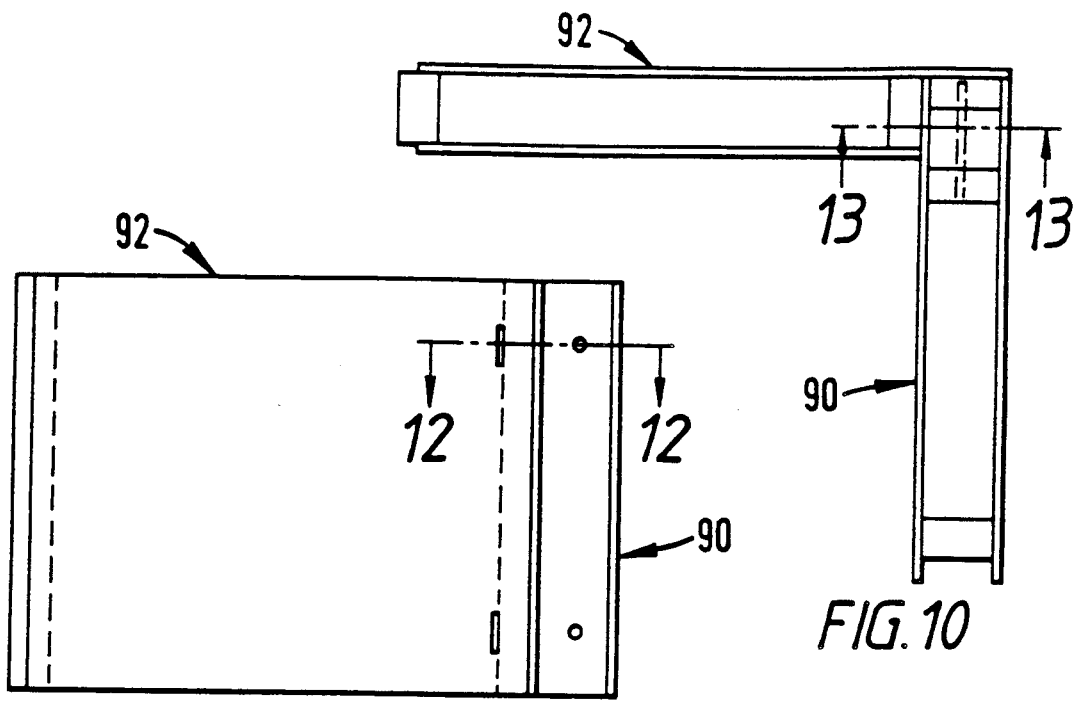
FIG. 10
FIG. 11
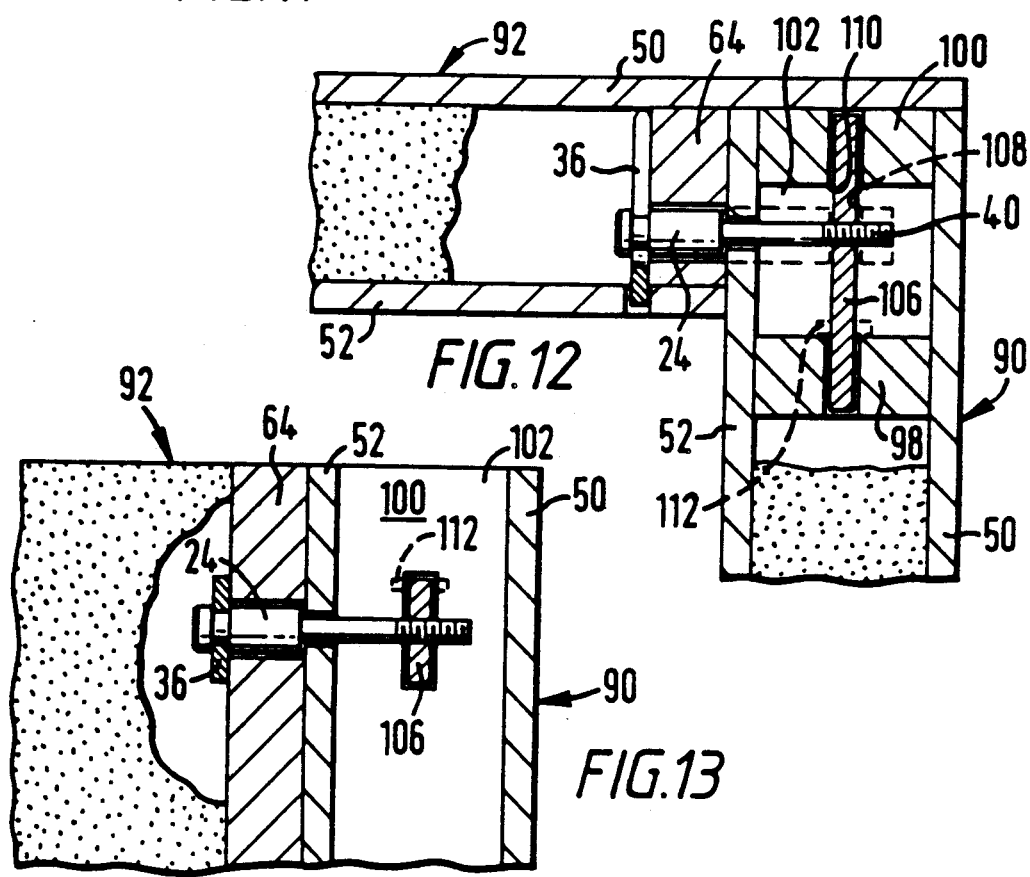
FIG. 12
FIG. 13

PANEL BUILDING ELEMENTS

BACKGROUND TO THE INVENTION

In the construction industry, cavity walling is generally made from two skins of brickwork and block work with a cavity between. This can be replaced by prefabricated building elements in the form of boards made as cavity panels having adequate mechanical properties.

A major problem is to fix such panels together firmly and accurately and to fix them in place on ground or floor.

THE INVENTION

According to one aspect of the invention, there is provided a building element. It will be appreciated immediately that the element can have much wider application than to walling. For example, the elements can be fixed together for floor or ceiling purposes, or again can be complete cylinders fixed one above another to form a support tower.

In transporting the prefabricated building elements according to the invention, there is a danger of the projecting fixing members being broken off or damaged by mis-handling. Therefore, according to another aspect of the invention, there is provided a building element in kit form. In use, this is assembled into a building element.

In the embodiments to be described in more detail with reference to the drawings, the main member is a panel and is double skinned. While fixing of one panel to another or to an anchorage can be contemplated to occur in the middle of a panel (to form a T-joint) the panel will normally be arranged (once assembled) or adapted (when in kit form) to have the fixing members in the region of an edge thereof. In a building system employing such panels, there will normally be a variety of different panels to be used in different ways within the final structure. In one such panel, the fixing member will project from an edge of the panel and in a direction parallel to the plane thereof. This will facilitate in-line fixing together of the panels when the fixing members project sideways and fixing of the panels to a base when the fixing members project downwards. The fixing members can also project adjacent an edge of the panel and in a transverse (preferably perpendicular) direction to the plane thereof. This facilitates formation of corners in a structure.

A particular sturdy form of the fixing member is as a pin with the shoulder circularly symmetric around the pin. For more positive location and locking of the fixing member to a contiguous co-operating element, the pin has a circularly symmetric neck there-around provided by said shoulder and an opposing shoulder. For anchoring the element, e.g. to a floor, the fixing member is formed as a rod with a bend to provide said shoulder. This bend can be in the plane of the panel or transverse (and preferably perpendicular) to the plane of the panel. The panel will usually have both at least one pin in the region of a side edge of the panel for sideways connection and at least one rod in the region of a bottom edge of the panel for anchorage to a base.

As the element is assembled from the main member and the fixing member as separate items, there will be provided holding means to hold the two together. Such holding means may comprise mutually co-operating threaded means with which the two members are provided or may comprise at least one outwardly facing shoulder on the fixing member, at least one inwardly facing shoulder on the main member and a retaining member arranged or adapted co-operating with such shoulders to prevent withdrawl of the fixing member from the main member.

As the main member is a double skinned panel, it is provided, for the purpose of in-line fixing to another element, with a block between the skins in the region of an edge of the panel, the element being arranged or adapted for the fixing member thereof to extend through the block and be held to the main member by the holding means at the inner face of the block. Preferably, the holding means then comprise internally threaded means on a plate fixed to the said inner face.

For corner fixing, as the main member is a double skinned panel, it may be provided with two spaced apart blocks extending alongside each other between the skins, the element being arranged or adapted for the fixing member thereof to extend through one of the skins to the space between the blocks and there be held to the main member by the holding means which preferably comprise internally threaded means on a plate slotted into both blocks.

The above description has related mainly to the projecting members for fixing the element to a co-operating element or anchorage but, in a complete building system, the element will be able to serve itself also as the aforesaid contiguous element. For this purpose, the element is formed with at least one opening, recess or the like arranged or adapted to receive the elongate fixing member of a contiguous co-operating element according to the invention to be retained there in order to fix the two elements together. As the main member of such an element is a double skinned panel, this may be provided with a further block between the skins in the region of an edge of the panel (which will be the opposite edge to the edge at which the fixing member/s project/s, in the case of in-line fixing together of a series of the elements), the element being arranged or adapted for the fixing member of the contiguous element to be able to extend through the block and be held to the main member by holding means at the inner face of the block. In this case, the latter holding means may comprise at least one shoulder on this element facing inwardly of this element and adapted or arranged to co-operate with a retaining member and (preferably indirectly with the aid of the retaining member) with at least one shoulder on the fixing member of the contiguous element facing towards the contiguous element, whereby to prevent withdrawal of the fixing member of the contiguous element from the element in question. In a preferred embodiment, the main member has a lateral slot for insertion of such a retaining member to engage (and preferably lock) the fixing member of the contiguous element.

For different purposes within the building system, one and/or another edge, as appropriate, of the double skinned panel with a said block in the region of the edge may have one of the following forms:

(a) the block extends slightly beyond both skins along substantially the whole of the edge;

(b) both skins extend slightly beyond the block along substantially the whole of the edge;

(c) the block is substantially flush with both skins along substantially the whole of the edge; or (d) one skin extends slightly beyond the block along the whole of the edge. Such forms can aid snug fit and- /or water-proofing, as exemplified in the following description with reference to the drawings, and may have other advantages, e.g. to aid fire-proofing.

If the elements are sold singly, each will normally be provided in combination with a retainer to retain the fixing member in a contiguous co-operating element or anchorage. The retainer is preferably in the form of a flat strip with an open-ended slot adapted to engage under the shoulder of the fixing member. This is particularly useful when the fixing member is a pin with a circularly symmetric shoulder and, if the pin has a neck at the shoulder in which the strip fits tightly, this can provide a good lock in the fixing of the element to a contiguous co-operating element.

Looked at as a whole, a building system may comprise an element according to the invention and an anchorage therefor arranged or adapted to co-operate with the fixing member of such element. While the anchorage may be provided laterally by, e.g., girder work, it is more usually envisaged as ground, floor or other base, in which case it is particularly suitable that it should be provided with a trench having fixed therein at least one retaining member to engage the or each depending fixing member of the element. The retaining member in the trench may be transverse thereto (and to the main member) to engage a single such fixing member and there may be a plurality of such retaining members in the trench to engage respective such fixing members, which has the advantage that the element can be placed in a position slightly spaced from an already fixed in-line contiguous element and then simply slid forwards to engage both that element and the retaining members in the trench simultaneously. Alternatively, the retaining member in the trench may be longitudinal thereto (and parallel to the main member) to engage a plurality of such fixing members depending from the element, in which case the element is positioned slightly to one side of its final position and then slid laterally thereto. In the preferred construction, the trench contains concrete to fix the shoulder of the or each relevant fixing member to bear against the retaining member. Preferably, the concrete extends between the or each shoulder and the or each respective retaining member in the trench so that the bearing therebetween is indirect. In this case, the concrete prevents actual contact between the fixing member/s and the retaining member/s with the attendant advantage of helping to prevent electrolytic action and/or corrosion.

A building system, as sold, may simply comprise an element according to the invention and at least one more element according to the invention to co-operate therewith. As used, a building system may further comprise an anchorage for at least one of these elements.

According to another aspect of the invention, there is provided a method of fixing building elements in which an element according to the invention (or such an element of a system according to the invention) is fixed to a contiguous element according to the invention (or such an element of a system according to the invention) or anchorage by retaining in the latter a said fixing member extending from the former. Such a method may include any one or more of the further details and principles hereinafter disclosed.

The invention also extends to a structure made using an element, system or method according to the invention.

DESCRIPTION WITH REFERENCE TO THE DRAWINGS

Reference will now be made by way of example to the accompanying drawings, in which:

FIG. 1 is an isometric view of a first embodiment of the invention showing two elements for in-line fixing together with retaining members;

FIG. 2 is a plan view of the FIG. 1 embodiment with the elements contiguous;

FIG. 3 is a front elevation view corresponding to FIG. 2;

FIG. 4 is a plan view of a fixing member of the FIG. 1 embodiment;

FIG. 5 is a section view, with parts broken away, taken along line 5—5 of FIG. 3;

FIG. 9 is an isometric view of a second embodiment of the invention comprising two elements for fixing together at a corner;

FIG. 10 is a plan view of the FIG. 9 embodiment with the elements contiguous;

FIG. 11 is a front elevation views corresponding to FIG. 10;

FIG. 12 is a section view, with parts broken away, taken along line 12—12 of FIG. 11;

FIG. 13 is a section view, with parts broken away, taken along line 13—13 of FIG. 10;

FIG. 14a and 14b are respectively plan and end elevation views of internally threaded means on a fixing plate of holding means of the FIG. 9 embodiment;

Figure 6:
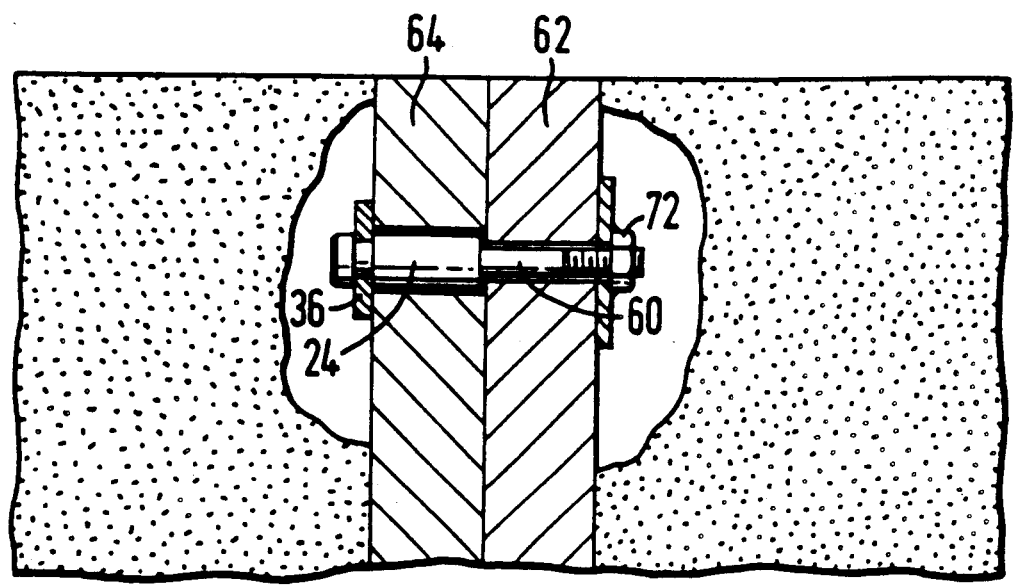
FIG. 6 is a section view, with parts broken away, taken along line 6—6 of FIG. 2.
Figure 7A:
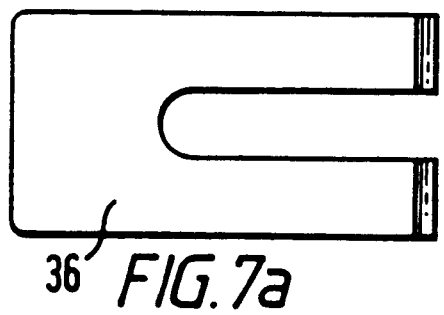
FIGS. 7a, 7b and 7c are respectively plan, end elevation and front elevation views of a retaining member of the FIG. 1 embodiment.
Figure 7B:
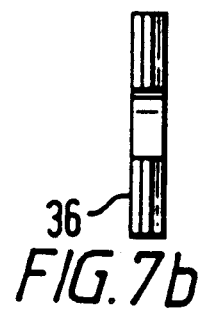
Figure 7C:
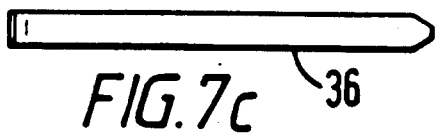

Referring to FIGS. 1 to 8 of the drawings, a building element 20 comprises a main member 22, an elongate fixing member 24 therefor projecting therefrom with a distal shoulder 26 (see FIG. 4) facing the main member 22 and spaced at a predetermined distance 28 (see FIG. 4) therefrom. Due to this spacing distance 28, the fixing member 24 can project a predetermined distance 30 into a contiguous co-operating element 32 (see FIG. 5). These distances will be slightly larger, but still predetermined, if a shimmy or spacing washer 34 is employed. The fixing member 24, FIG. 5, is retained in position with the aid of said shoulder 26 engaged by a retaining member 36 to fix the element 20 to said co-operating element 32.

For the purposes described, the element 20 may be supplied in the form of a kit of parts comprising the main member 22 and at least one said fixing member 24. The shoulder 26 faces the end 38 of the fixing member 24. The kit includes holding means 40,42 for holding the fixing member 24 to the main member, and spacing means in the form of shoulder 44 (possibly with washer 34) predetermining distances 28,30.

The fixing member 24 is a pin and the shoulder 26 is circularly symmetric around the pin 24. Further, the pin 24 has a circularly symmetric neck 46 therearound provided by said shoulder 26 and an opposing shoulder 48.

The main member 22 is a panel and is double skinned, being provided with the skins 50,52, interfilled with an insulating filling 54. The fixing member 24 is in the region of edge 56, FIG. 1, which edge extends over the whole thickness of panel 22. The fixing member 24 projects from edge 56 in a direction 58 parallel to the plane of the panel.

The holding means 40,42 comprise mutually cooperating threaded means 40 with which member 24 is provided and 42 with which member 22 is provided. The panel 22 is provided with a block 62 in the region of edge 56, a block 64 in the region of the opposite edge and blocks 66,68 to seal in the filling 54 and structure panel 22 by having fixed thereto the skins 50,52. The narrow part 60 of fixing member 24 extends through the block 62 (see FIG. 5) and is held to the main member 22 by the holding means 40,42 at the inner face 70 of the block 62. The holding means comprise a portion 42 consisting of internally threaded means in the form of nut 72 on (and welded to) a plate 74 fixed by woodscrews 76 to said inner face 70. The holding means also comprise a portion 40 which is an externally threaded portion of fixing member 24.

Figure 8A:
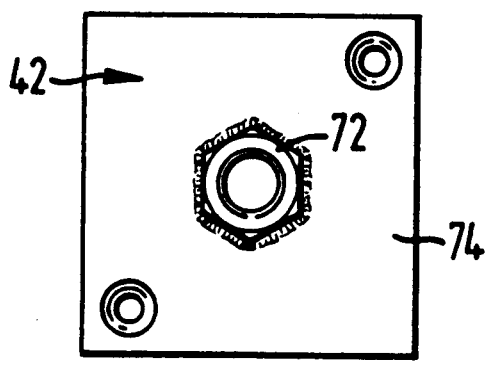
FIGS. 8a and 8b are respectively plan and end elevation views of threaded means on a fixing plate of holding means of the FIG. 1 embodiment.
Figure 8B:
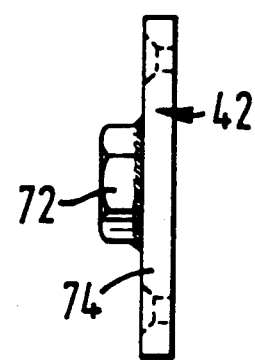

In assembly of element 20, block 62 is prepared with holes 78. Portions 42 of the holding means are manufactured as shown in FIGS. 8a and 8b and fixed by woodscrews 76 to block 62. Blocks 62, 64, 66 and 68 as a frame are fixed together with one of skins 50,52. Filling 54 is inserted and the other skin fixed in place, the fixing being done by screws, nails or any other convenient means. After the element 20 has been transported to the site, fixing members 24 (possibly with washers 34) are screwed home into nuts 72.

Element 32 is identical with element 20. Element 32 is formed with at least one opening, recess or the like 80 in its block 64 to receive the fixing member 24 of a contiguous co-operating element 20 to be retained there to fix the two elements together. As seen in FIG. 5, the wide part 82 of fixing member 24 of element 20 extends through the block 64 of element 32 and is held to the main member of element 32 by holding means comprising retaining member 36 at the inner face 84 of the block 64. The holding means further comprise the shoulder 86 formed at the junction of face 84 and hole 80 and shoulder 26 of fixing member 24. The three parts co-operate to prevent withdrawal from element 32 of the fixing member 24 of the contiguous element 20. The main member has a lateral slot 88 for insertion of the retaining member 36 to engage the fixing member 24 of the contiguous element 20.

For a second embodiment of the invention, for corner construction, reference will now be made to FIGS. 9 to 14 of the drawings, in which like designations are used for parts having like functions to those in the first embodiment. Elements 90 and 92 correspond respectively to elements 20 and 32. As seen in FIG. 9, the right-hand end of element 90 and the left-hand end of element 92 have the same form and functions as the corresponding ends of elements 20 and 32. The other end of each of elements 90 and 92 is modified to accommodate a corner connection. The fixing member 24 projects as aforesaid adjacent an edge 56 of element 90, the edge extending over the whole thickness of the element, the projection being in a transverse direction 94 to the plane of the element 90 and, in the embodiment shown in FIG. 9, this direction being perpendicular to such plane. The double skinned panel main member 96 is provided with two spaced apart blocks 98,100 extending alongside each other between the skins 50,52. The fixing member 24 extends through one of the skins 52 to the space 102 between the blocks 98, 100 is held there to the main member 96 by holding means comprising internally threaded means 104 on plate 106 slotted into both of blocks 98,100. Alternatively, as shown in dashed lines in FIG. 12, the holding means may comprise at least one outwardly facing shoulder 108 on the fixing member 24, at least one inwardly facing shoulder 110 on the main member 96 and a retaining member 106 shaped and acting like the retaining member 36 with no threaded portions thereon or on member 24, which latter may in fact have mutually symmetrical ends. Space 102 may be filled with a block 102 drilled with skin 52 and serving to support member 24 against sideways movement when plate 106 serving the function of retaining member 36 is inserted. Plate 106 may be provided with a stop 112 to prevent it from being inserted too far.

As will be seen, for different purposes, one or another edge of elements 20,32,90,92 may have, as seen in FIG. 9:

(a) block 62 extending slightly beyond both skins 50,52 along substantially the whole of the edge 114, (b) both skins 50,52 extending slightly beyond the block 64 along substantially the whole of the edge 116, (c) the block 100 substantially flush with both skins 50,52 along substantially the whole of the edge 56 or (d) one skin 50 extending slightly beyond the block 64 along substantially the whole of the edge 118.

Figure 15:
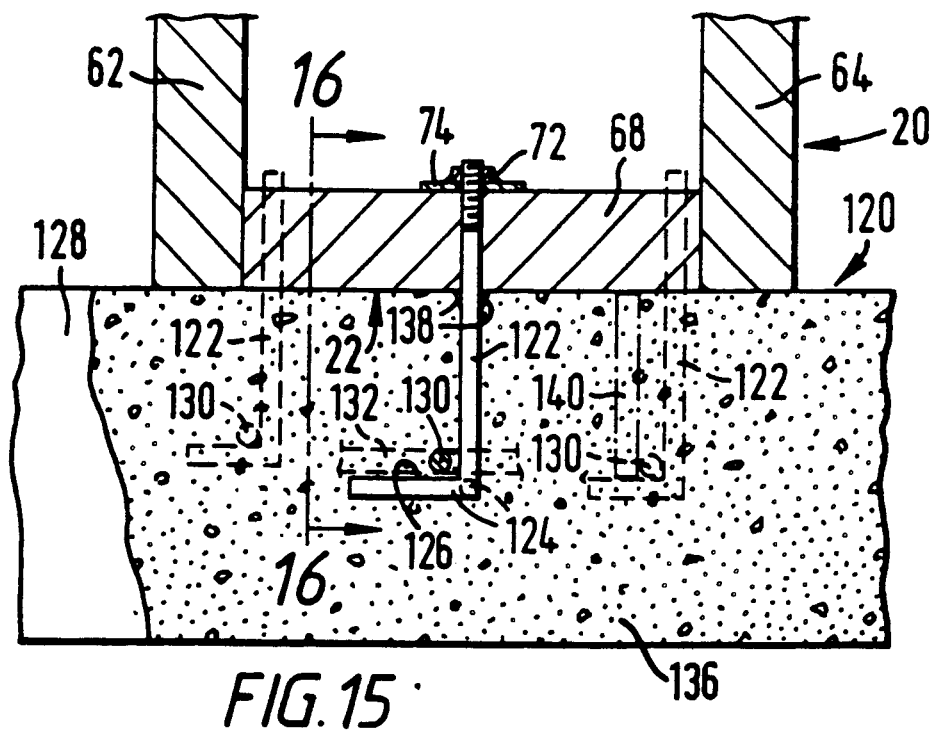
FIG. 15 is a section view, with parts broken away, of the panel and anchorage trench, of constituting a third embodiment of the invention.
Figure 16:
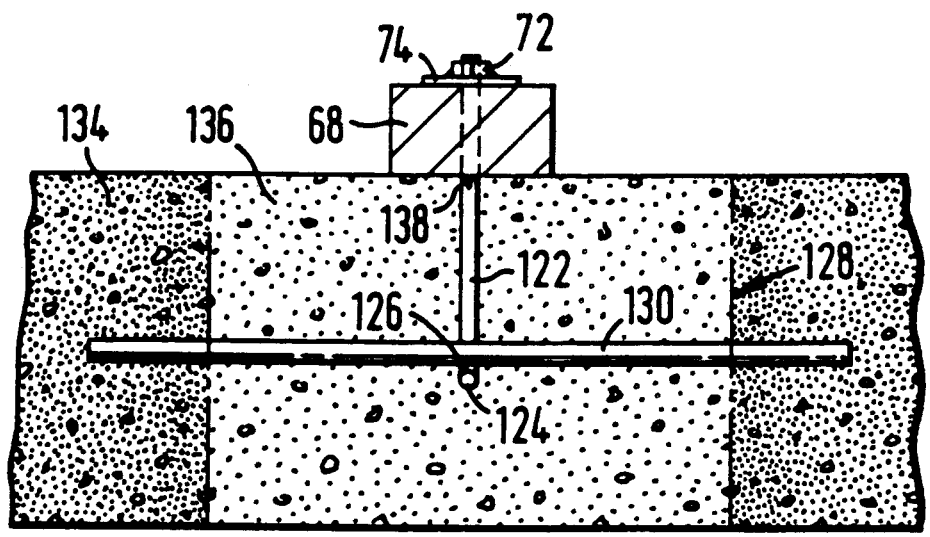
FIG. 16 is a cross section view taken along line 16—16 of FIG. 15.

With reference to FIGS. 15,16, a third embodiment of the invention is suitable for fixing the element 20 to a contiguous co-operating anchorage 120. The fixing member 122 is a rod with a bend 124 to provide said shoulder 126. The element 20 has said bend 124 in the plane of the panel 22 (the plane of FIG. 15). Anchorage 120 co-operates with the fixing member 122 of element 20. The anchorage 120 is ground, floor or other base 134 with a trench 128 having fixed therein a retaining member 130 to engage the fixing member 122. The retaining member 130 in the trench 128 is transverse to the plane of element 20 to engage a single such fixing member 122. As shown in dashed lines, there may be a plurality of such retaining members 130 in the trench to engage respective such fixing members 122 spaced apart along the length of the element 20. In an alternative arrangement, the bends 124 of fixing members 122 are rotated out of the plane of the element 20, as shown in dashed lines in FIG. 15 and the retaining member 132 in the trench 128 is parallel to the plane of element 20 to engage a plurality of such fixing members 122.

In either case, the trench contains concrete 136 to fix the shoulder to bear against the retaining member or members 130,132. Preferably, as shown, the concrete extends beyond between the or each shoulder 126 and the or each respective retaining member 130,132 in the trench 128 so that the bearing therebetween is indirect.

Preferably, as seen in FIG. 3, one and the same panel, e.g. 20, has at least one fixing member 24 in the region of a side edge 56 of the panel main member 22 and at least one fixing member 122 in the region of a bottom edge 137 of the panel main member 22.

The elements are fixed to one another and to the anchorage as hereinabove described to make any suitable structure, which may thereby be made modular. The retaining members 36 and fixing members 24 are made to tolerances such as to ensure that they and the elements are locked into position slightly stressed. Spacing means for fixing members 122 may be e.g. upset lugs 138 or a removable template 140 to indicate when member 122 is screwed sufficiently far into nut 72.

The frame blocks 62, 64, 66 and 68 and the skins 50, 52 can be made of a tough, dense, cement-bonded particle board, e.g. that manufactured under the trade name DURIPANEL by the Chessminster Group Limited of Ystrad Mynach, near Caerphilly, Glamorgan, Wales.

Any features hereinabove disclosed may be combined in any way so long as they are compatible.

The elements illustrated may be used to constitute the walls of houses or other buildings and may be one storey high, somewhat wider and 94 mm. thick. They may be fixed together one row upon another. Fixing member 24, FIG. 4, may be 112 mm. long and 18 mm. outside diameter. The fixing and retaining members and holding means may be of stainless steel. The parts of each Figure may be mutually to scale.

For the purpose of the present description and claims, "anchored" means "firmly fixed." As seen from the embodiments, the fixing means are fixed firmly (i.e. anchored) to the relevant block(s) of the main member by anchorage means shown, for example in FIG. 5, as constituting the threaded holding means 42 which engage with the threaded end of fixing member 24 passing through the block. In FIG. 12, the anchorage means constitute plate 106 anchored to the spaced apart blocks 98 and 100 and engageable with the threaded end of pin 24 passing through block means defined by the spaced apart blocks and the space therebetween.

The scope and variety of embodiments of the invention are not limited by the foregoing description but can have the widest applications consistent with the ensuing claims.

What is claimed:

1. A building assembly comprising:
   first and second building elements comprising first and second respective double-skinned panel members;
   at least one elongate fixing member having a longitudinal axis, said member having an anchoring end and a locking end;
   first block means in a region of an edge of said first panel member for supporting said fixing member, the anchoring end of said fixing member passing through said block means;
   anchor means on said anchoring end and said first block means for firmly anchoring said fixing member to said first panel member with the locking end projecting from said panel member;
   second block means in a region of an edge of said second panel member for receiving the projecting portion of said fixing member;
   the locking end of said fixing member passing through said second block means, said locking end comprising a head portion and a recessed portion located adjacent to said head portion to define shoulder means;
   a locking element engageable with the locking end of said fixing member, said locking element comprising a plate having an open-ended slot extending longitudinally from one end thereof, said slot being configured to receive the recessed locking end portion of said fixing member; and
   said second panel member having an opening in one of its skin panels to permit insertion of said locking element for engagement with the locking end of said fixing member to retain said building elements in contiguous relation.

2. The building assembly of claim 1, wherein said first and second block means extend substantially the entire length of said panel edge between the skins of said respective panel members.

3. The building assembly of claim 1, wherein the locking end of said fixing member projects from said first panel member in a direction parallel to the plane thereof.

4. The building assembly of claim 1, wherein the locking end of said fixing member projects from said first panel member in a direction perpendicular to the plane thereof.

5. The building assembly of claim 1, wherein said anchor means comprises a plate connected to said first block means and includes interengageable threaded fasteners on the anchoring end of said fixing member and said plate.

6. The building assembly of claim 1 wherein said first block means comprises a pair of block members spaced apart to define a space therebetween, said anchor means comprising a plate connected to said block members and extending across said space, and including interengageable fasteners on the anchoring end of said fixing member and said plate.

7. The building assembly of claim 1, including a base defining a trench, at least one additional elongate fixing member having an anchoring end and a locking end, the locking end of said additional fixing member including shoulder means, third block means in a region of a bottom edge of one of said panels for supporting said additional fixing member, the anchoring end of said additional fixing member passing through said third block means, anchor means on said anchoring end of said additional fixing member and said third block means for firmly anchoring said additional fixing member to said associated panel with the locking end projecting from said panel member, said building elements located on said base with the locking end of said additional fixing member projecting into said trench, and an additional locking element fixed in said trench engageable with the locking end shoulder means of said additional fixing member.

* * * * *